(No Model.)
A. T. LAUBE.
DOUBLE BAKING PAN.
No. 304,111. Patented Aug. 26, 1884.
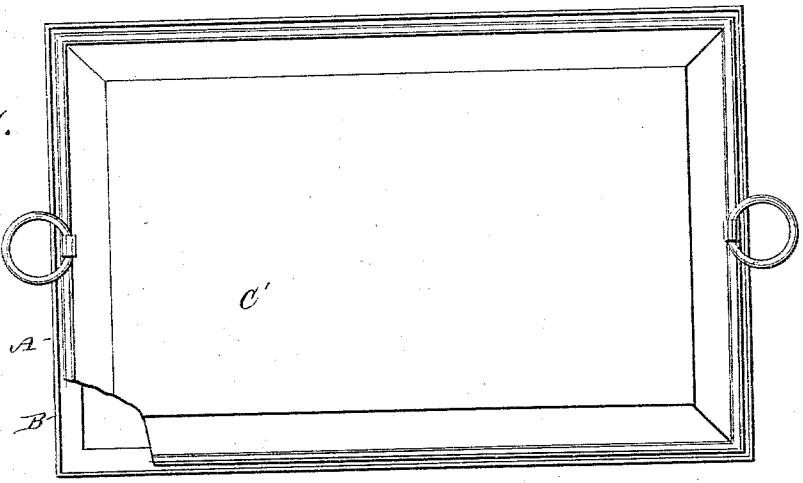
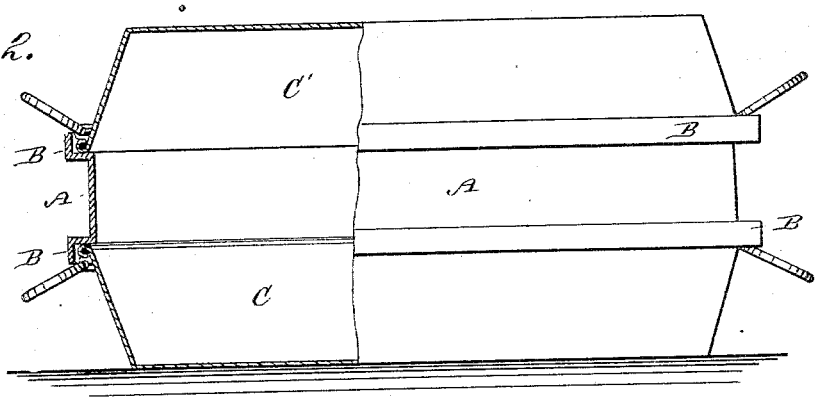
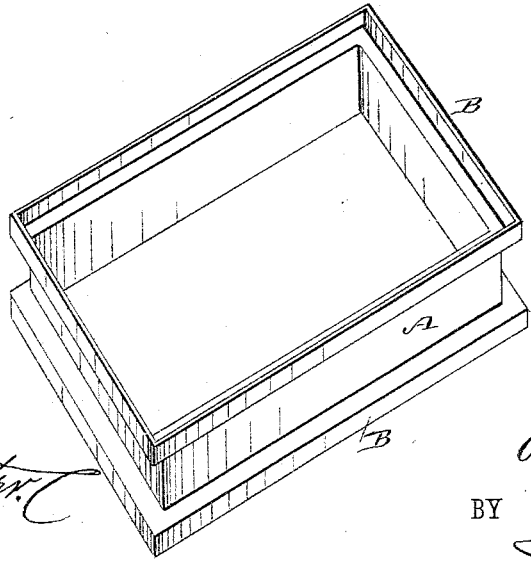
WITNESSES:
INVENTOR:
A. T. Laube
BY Munn & Co.
ATTORNEYS.

UNITED STATES PATENT OFFICE.

ANNIE T. LAUBE, OF HURON, DAKOTA TERRITORY.

DOUBLE BAKING-PAN.

SPECIFICATION forming part of Letters Patent No. 304,111, dated August 26, 1884.

Application filed February 12, 1884. (No model.)

*To all whom it may concern:*

Be it known that I, ANNIE T. LAUBE, of Huron, in the county of Beadle and Territory of Dakota, have invented a new and Improved Double Baking-Pan, of which the following is a full, clear, and exact description.

The object of my invention is to provide a new and improved baking-pan formed of two ordinary baking-pans.

The invention consists in a double baking-pan formed of two ordinary pans united by a rim or frame placed between them, the said rim having an angular flange on the top and bottom edges, which flanges are to receive the edges of the pans, the bottom pan standing right side up and the upper pan being inverted.

Reference is to be had to the accompanying drawings, forming a part of this specification, in which similar letters of reference indicate corresponding parts in all the figures.

Figure 1 is a plan view of my improved double baking-pan, parts being broken out. Fig. 2 is a longitudinal elevation of the same, parts being broken out and others shown in section. Fig. 3 is a perspective view of the rim or frame for uniting the pans.

A rim or frame, A, made of cast or sheet metal, is provided at the top and bottom edges with an outwardly-projecting angular flange, B. The rim or frame A is placed on the upper edge of the pan C in such a manner that the angular flange projects over the rim, as shown in Fig. 2. An inverted pan, C', is then placed on the upper angular flange. The rim or frame thus unites the pans and forms a double pan, which can be used for baking bread or cooking other articles. The pans C and C' are of the usual construction.

The height of the frame or rim A may be varied as may be desired. The shape of the rim or frame A must be the same as that of the pans to be united by the rim or frame.

Having thus described my invention, I claim as new and desire to secure by Letters Patent—

1. A double baking-pan formed of two ordinary baking-pans, united by a separable flanged rim or frame placed between the adjoining rims of the pans, the lower pan standing right side up and the upper pan being inverted, substantially as herein shown and described.

2. The rim or frame A, provided with an angular flange, B, at the top and bottom edge, for the purpose of receiving the rims of pans, substantially as herein shown and described.

ANNIE T. LAUBE.

Witnesses:
DAVID GOMBAR,
SAMUEL GOMBAR.